United States Patent
Cai et al.

(10) Patent No.: US 10,346,268 B2
(45) Date of Patent: Jul. 9, 2019

(54) EFFICIENT DATA RECOVERY FOR WRITE PATH ERRORS

(71) Applicant: SK Hynix Inc., Gyeonggi-do (KR)

(72) Inventors: Yu Cai, San Jose, CA (US); Fan Zhang, Fremont, CA (US); Sangcheol Lee, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 135 days.

(21) Appl. No.: 15/624,520

(22) Filed: Jun. 15, 2017

(65) Prior Publication Data

US 2018/0024897 A1   Jan. 25, 2018

Related U.S. Application Data

(60) Provisional application No. 62/365,233, filed on Jul. 21, 2016.

(51) Int. Cl.
| | | |
|---|---|---|
| *G06F 11/00* | (2006.01) | |
| *G06F 11/16* | (2006.01) | |
| *G06F 11/18* | (2006.01) | |
| *G06F 11/08* | (2006.01) | |

(52) U.S. Cl.
CPC .......... *G06F 11/1666* (2013.01); *G06F 11/08* (2013.01); *G06F 11/1608* (2013.01); *G06F 11/18* (2013.01)

(58) Field of Classification Search
CPC .. G06F 11/1666; G06F 11/1608; G06F 11/18; G06F 11/08; G06F 11/1076; G06F 11/1096; G06F 11/14; G06F 11/16; G06F 11/1629
See application file for complete search history.

(56) References Cited

U.S. PATENT DOCUMENTS

| | | | |
|---|---|---|---|
| 5,603,001 A * | 2/1997 | Sukegawa | G06F 3/0601 |
| | | | 711/103 |
| 7,945,752 B1 | 5/2011 | Miller et al. | |
| 8,621,142 B1 * | 12/2013 | Miller | G06F 3/0611 |
| | | | 711/103 |
| 9,032,245 B2 | 5/2015 | Roh | |
| 2005/0289253 A1 | 12/2005 | Edirisooriya et al. | |
| 2012/0192035 A1 * | 7/2012 | Nakanishi | G06F 11/1048 |
| | | | 714/766 |
| 2013/0042053 A1 * | 2/2013 | Huang | G06F 11/106 |
| | | | 711/103 |
| 2018/0061498 A1 * | 3/2018 | Hazama | G06F 12/16 |

* cited by examiner

*Primary Examiner* — Anthony J Amoroso
(74) *Attorney, Agent, or Firm* — Kilpatrick Townsend and Stockton

(57) ABSTRACT

Systems and methods are provided for flash memory devices to improve the write performance in case of write path errors and to hide the write path error correction latency. Some embodiments can provide instant parity correction to allow user data sharing the same strip with the data block having an error to be programmed into the flash memory before the failed data is corrected. Additionally, selected stalling can allow some independent data in different flash memory dies or planes to be programmed during the time of write path error correction.

20 Claims, 12 Drawing Sheets

EFFICIENT DATA RECOVERY FOR WRITE PATH ERRORS

CROSS-REFERENCES TO RELATED APPLICATIONS

The present application claims priority to U.S. Provisional Application No. 62/365,233, entitled "QUICK DATA RECOVERY DUE TO WRITE PATH ERROR FOR RAID," filed Jul. 21, 2016, which is commonly assigned and expressly incorporated by reference herein in its entirety for all purposes.

BACKGROUND OF THE INVENTION

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' or 'flash memory devices' (for example, NAND and NOR flash memory devices), are used in media storage, cameras, mobile phones, mobile computers, laptop computers, USB flash drives, etc. Non-volatile memory can provide a relatively reliable, compact, cost-effective, and easily accessible method of storing data when the power is off.

Flash memory controllers are used to manage the data stored in the non-volatile memory, and to act as an interface between a host system and the non-volatile memory. The data received from the host system can be stored in a buffer and simple error detection and correction can be performed on the data before writing the data into the flash memory. Generally, a write path inside a flash memory controller may provide a channel to program the flash memory. However, in some instances, the write path may be prone to errors. When an error is detected in the write path for a data block received from the buffer, the flash memory controller generally halts all the write operations to the flash memory issued after the data block with the write path error. The flash memory controller has to correct the errors in the write path, resend the corrected data block and then resume the write operations to the flash memory. This may introduce unnecessary latency in the write operations to the flash memory.

In some instances, parity data may be used to provide error detection and correction for the write path. For example, the parity data may be calculated by performing an XOR operation on the received data block with the previously received data blocks. However, error in one data block may result in the wrong parity data calculation. Thus, the parity data may also need to be corrected which can introduce additional latency in the data path.

BRIEF SUMMARY OF THE INVENTION

Embodiments of the invention pertain to systems, methods, and computer-readable instructions for flash memory devices to provide efficient data recovery in case of write path errors by speeding up the write performance and hiding the write path error correction latency. Some embodiments can provide instant parity correction to allow user data sharing the same strip with the data having an error to be programmed into the flash memory before the failed data is corrected. Additionally, selected stalling of the data can allow some independent data in different flash memory dies or planes to be programmed during the time of write path error correction.

According to some embodiments, an apparatus can comprise a write path error detector configured to detect if a received data block from a set of data blocks has an error. The apparatus can further comprise a parity calculator configured to calculate a parity data for the data block. The apparatus can also comprise a processor configured to execute instructions stored in a memory, wherein the instructions stored in the memory cause the processor to perform error correction on the data block with the error. The apparatus can also comprise a write path manager. The write path manager may be configured to stall the data block with the error from storing in a flash memory buffer, and allow storing of subsequent data blocks without error received after the data block with the error into the flash memory buffer during the error correcting of the data block with the error. The parity calculator may be further configured to recalculate the parity data for the set of data blocks based on the data blocks without error and the error corrected data block. The apparatus may be part of a backend flash controller which may be part of a flash memory controller coupled to the flash memory and to a host system.

According to some embodiments, a method can comprise receiving, by a flash memory controller coupled to a flash memory, one data block at a time from a first set of data blocks stored in a volatile memory. The volatile memory may store a plurality of sets of data blocks comprising the first set of data blocks and a second set of data blocks. The method further comprises detecting an error in one of the received data blocks and calculating a parity data based on the received one or more data blocks from the first set of data blocks. The method further comprises stalling the data block with the error from storing in a flash memory buffer and error correcting the data block with the error. The method further comprises storing subsequent data blocks without error received after the data block with the error into the flash memory buffer during the error correcting of the data block with the error.

The method can further comprise determining that determining that the error in the data block with the error has been corrected and recalculating the parity data for the first set of data blocks based on the error corrected data block and the data blocks without error. The method further comprises storing the recalculated parity data for the first set of the data blocks, and the error corrected data block in the flash memory buffer.

Some embodiments are directed to a flash memory controller comprising one or more processors configured to implement various methods. Other embodiments are directed to a computer readable medium having stored thereon instructions that when executed by a processor perform several processes.

DETAILED DESCRIPTION OF THE INVENTION

Figure 1:
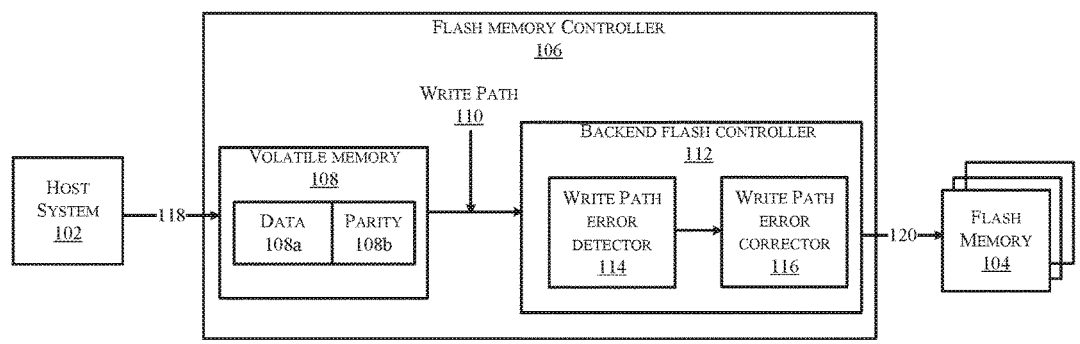
FIG. 1 is a simplified block diagram illustrating a system including a host system coupled to a flash memory device according to some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

Embodiments of the invention pertain to systems, methods, and computer-readable instructions for quick data recovery from write path errors in the data. Methods, systems, and computer-readable media as described in the disclosure can be used, for example, in a NAND flash memory device.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

Certain aspects of the disclosure provide a method to improve the write performance of a flash memory device when there is a write path error. When an error is detected with a data block in the write path, certain embodiments can stall the data block with the error from storing in a flash memory buffer and can perform error correction on the data block with the error. The embodiments can also allow programming of subsequently received data blocks without error into the flash memory buffer during the error correcting of the data block with the error.

Figure 2:
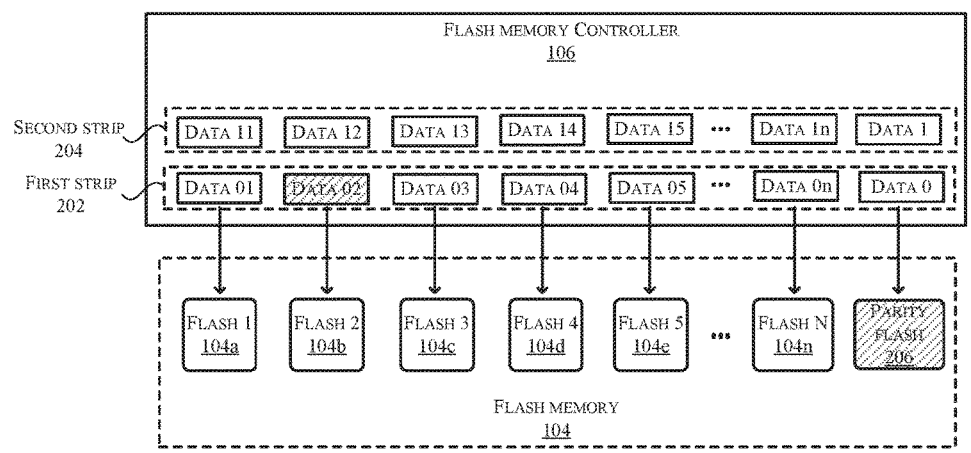
FIG. 2 is an example illustration of a configuration of a flash memory.
Figure 3:
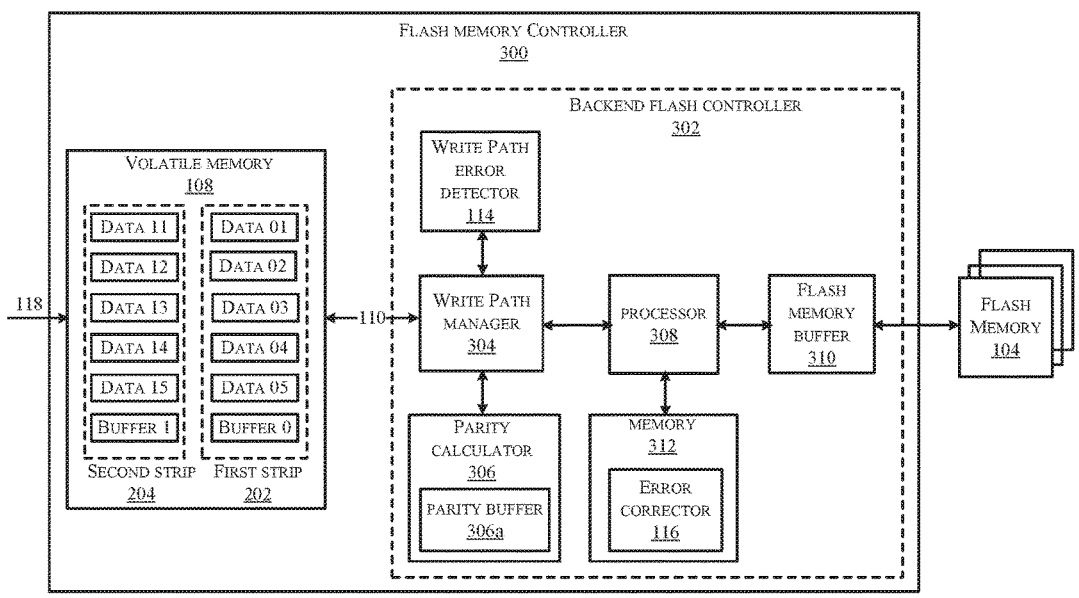
FIG. 3 illustrates a block diagram of a flash memory controller which can provide an improved write performance in case of write path errors, in some embodiments.

FIG. 1 is a simplified block diagram illustrating a system including a host system coupled to a flash memory via a flash memory controller. FIG. 2 illustrates a configuration of a flash memory, according to some embodiments. FIG. 3 illustrates an example block diagram of a backend flash controller, in one embodiment. FIGS. 4-11 illustrate different steps used for improving write performance in the presence of write path error, in some embodiments. FIG. 12 illustrates a method performed by a flash memory controller in one embodiment.

FIG. 1 is a simplified block diagram illustrating a system 100 including a host system 102 coupled to a flash memory 104 via a flash memory controller 106. In some implementations, the flash memory controller 106 and the flash memory 104 may be part of a flash memory device (not shown). The flash memory controller 106 may be implemented as a system on chip (SoC), an application specific integrated circuit (ASIC), a field programmable gate array (FPGA), or any suitable circuit.

The host system 102 can include any appropriate hardware device, software application, or a combination of hardware and software. In some embodiments, the host system 102 can include a host-side controller (not shown). The host system 102 can send requests to the flash memory controller 106 to access the flash memory 104, e.g., to write data into the flash memory 104 or to read the data from the flash memory 104.

The flash memory controller 106 may be configured to receive various commands from the host system 102 and communicate with the flash memory 104 based on these commands. The flash memory controller 106 can enable the flash memory 104 to perform various operations based on the commands received from the host system 102. For example, the host system 102 can communicate with the flash memory controller 106 to program, erase, read, or trim parts of the flash memory 104. The flash memory controller 106 may include a volatile memory 108 and a backend flash controller 112. A write path 110 may provide a data path or a channel to program the flash memory 104 or to write the data into the flash memory 104 via the backend flash controller 112. The term "channel" may be used to specify a path between two physical components. It will be understood that the channel may include other physical components.

The volatile memory 108 may include any type of static random access memory (SRAM), dynamic random access memory (DRAM), or any other type of memory that may require power to maintain its data. The volatile memory 108 may be used to store data 108a received from the host system 102 for writing into the flash memory 104 by the backend flash controller 112. The data 108a may also be termed "user data" in this specification.

In some instances, errors may be introduced in the write path 110 before the data 108a is written into the flash memory 104. For example, errors may occur due to internal errors in the volatile memory 108 or during the transmission of the data 108a from the volatile memory 108. Thus, it is desirable to protect the data path between the volatile memory 108 and the backend flash controller 112. In some implementations, error correcting code (ECC) methodology may be implemented to protect the data path between the volatile memory 108 and the backend flash controller 112 using a simple error correction parity data. For example, parity 108b may be added to the data 108b that can be used to provide ECC detection and correction in case the data 108b was corrupted in the write path 110.

In some implementations, the flash memory 104 can be any non-volatile memory, e.g., a NAND flash. In some implementations, the flash memory 104 can be a NOR flash memory configured to interact externally as a NAND flash. The flash memory 104 can be designed to store data in the absence of a continuous or substantially continuous external power supply. In some examples, the flash memory 104 can be used for secondary data storage, e.g., in a computer system such as a laptop. In some such examples, the flash memory controller 106 can interact with a plurality of flash memories. In some embodiments, other non-volatile memory can be used in place of or in addition to the flash memory 104. Examples can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

In some implementations, the flash memory 104 may include a plurality of blocks comprising pages. The plurality of blocks may include blocks that can be on different planes, e.g., plane 0 or plane 1. Plane 0 can include a first set of blocks and plane 1 can include a second set of blocks. There may be a different number of planes per flash memory die. A plurality of such dies can be included in a flash memory, such as the flash memory 104. In some implementations, a main block may be used to store data, and an extended block may be used to store auxiliary information, e.g., error correction codes or parity.

The backend flash controller 112 may include a write path error detector 114 and a write path error corrector 116. The write path error detector 114 may be configured to detect errors in the data 108a. For example, the write path error detector 114 may perform ECC detection using the parity data 108b associated with the data 108a. The write path error corrector 116 may be configured to perform ECC correction to correct the data with the error. Any ECC algorithm, e.g., Reed-Solomon code, Hamming code, Bose-Chaudhuri-Hocquenghem (BCH) code, low density parity check (LDPC), or any other suitable algorithm may be utilized to implement data protection for the data to be stored in the flash memory 104.

When the backend flash controller 112 receives the data 108a, the write path error detector 114 may determine if there are any errors in the data 108a based on the parity 108b. If there are no errors in the data 108a, the data may be written into the flash memory 104. If the write path error detector 114 detects an error in the data 108a, the write path error corrector 116 may perform error correction on the data 108a. The error correction can be performed by software or firmware. In most instances, since the failure rate in the write path 110 is relatively low, the error correction may be performed in software to save chip area and power. However, software based error correction can be time consuming and can introduce additional latency in the data path.

In some implementations, a data protection methodology, e.g., RAID (redundant array of inexpensive disks), may be used to recover the data stored in the flash memory 104 when data on a plane or a die is corrupted. For example, RAID may utilize mirroring, data striping, parity, or a combination thereof to provide data redundancy and error correction. In some implementations, a set of data blocks may be split into different strips so that each strip may represent user data on a plurality of dies or planes, and parity data on one or more dies and planes. The parity data may be generated by performing an XOR operation on the user data in a strip. In some implementations, each strip can represent a super block. For example, a super block may include a first block in a first die, a second block in a second die, a third block in a third die and so on. When the data on one of the dies or planes is corrupted and cannot be corrected, other data in the same strip across different dies or planes can be read. An XOR operation may be performed on the read data and the parity data to recover the data for the uncorrectable die or plane. This is further explained with reference to FIG. 2.

FIG. 2 is an example illustration of the organization of the flash memory 104. It is to be noted that a structure 200 shown in FIG. 2 is for illustrative purposes only and the actual physical organization of the flash memory 104 can differ substantially from the depiction.

In some implementations, the flash memory 104 may include a plurality of flash memory dies flash 1 104a, flash 2 104b, flash 3 104c, flash 4 104d, flash 5 104e, . . . , flash N 104n. Each of the flash memory dies flash 1 104a-flash N 104n may include multiple planes. Each plane may store multiple blocks of data. In some implementations, a separate flash memory die, e.g., parity flash 206, may be used to store parity bits for the data stored on the flash 1 104a-flash N 104n.

In some implementations, a first strip 202 may represent a plurality of data blocks, e.g., data 01, data 02, data 03, data 04, data 05, . . . , data 0n. The first strip 202 may also include a block for parity, e.g., data 0. For example, data 0 may represent parity data for the data blocks associated with the first strip 202, e.g., data 01-data 0n. Similarly, a second strip 204 may represent a plurality of data blocks, e.g., data 11, data 12, data 13, data 14, data 15, . . . , data 1n. The second strip 204 may also include a block for parity, e.g., data 1. The data 1 may represent parity data for the data blocks associated with the second strip 204, e.g., data 11-data 1n. In some implementations, a first block from each strip may be stored on a first die, a second block from each strip may be stored on a second die, and so on. For example, the data 01 and data 11 may be stored on the flash 1 104a, the data 02 and data 12 may be stored on the flash 1 104b, the data 03 and data 13 may be stored on the flash 1 104c, the data 04 and data 14 may be stored on the flash 1 104d, the data 05 and data 15 may be stored on the flash 1 104e, and the data 0n and data 1n may be stored on the flash 1 104n. In some implementations, the parity data data 0 and data 1 may be stored on the separate parity flash 206.

In some embodiments, the data 01 and the data 11 may be stored in different planes on the flash 1 104a. Similarly, the data 02 and the data 12 may be stored in different planes on the flash 2 104b, the data 03 and the data 13 may be stored in different planes on the flash 3 104c, the data 04 and the data 14 may be stored in different planes on the flash 4 104d, the data 05 and the data 15 may be stored in different planes on the flash 5 104e, and the data 0n and the data 1n may be stored in different planes on the flash N 104n.

In some instances, all the data in a strip may be written into different dies or planes in parallel. For example, each of the user data, e.g., data 01-data 0n, and the parity data, e.g., data 0, in the first strip 202 may be written in parallel in the flash 1 104a-flash N 104n and the parity flash 206 in the flash memory 104. However, if a write path error is detected in a data block received from the host system 102, the backend flash controller 112 may typically stall writing any subsequent data blocks received from the host system 102 after the received data block with the error to the flash memory 104. The backend flash controller 112 may first correct the write path error, recalculate the parity and then allow writing of the subsequent data blocks received from the host system 102 to the flash memory 104. However, during this time, other data on the strip cannot be written into the flash memory 104 which can introduce additional latency in the data path.

As an example, the backend flash controller 112 may receive one data block at a time from the volatile memory 108, e.g., data 01, data 02, data 03, . . . , data 0n. A parity data may be calculated as each data block is received by performing an XOR operation on one or more received data blocks. If the data 02 has an error, the backend flash controller 112 may stall writing data 03, data 04, . . . , data 0n to the flash memory 104 until the error in the data 02 is corrected, which may cause additional latency. Furthermore, due to the error in data 02, the parity data 0 that has been calculated by performing an XOR operation on data 01 and data 02 may include a wrong value and may need to be recalculated. The recalculation of the parity can further decrease the performance.

Certain embodiments of the invention can accelerate the data recovery by allowing the data without error to be written into the flash memory while the data with the error is being corrected. For example, when an error is detected in a data block, writing of the data block with the error and the associated parity data to the flash memory 104 is stalled until the error is corrected. While the error is corrected in the data block with the error, other error free data blocks associated with different dies or planes can be programmed. When the error is corrected, the parity of the data blocks for that strip can be recalculated. The corrected data block and the recalculated parity data can be written into the flash memory 104. This is further explained with reference to FIG. 3.

FIG. 3 illustrates a block diagram of a flash memory controller 300 which can provide an improved write performance in case of write path errors, in some embodiments.

The flash memory controller 300 may include the volatile memory 108 and a backend flash controller 302. Note that the flash memory controller 300 may include additional or different components which are not shown in FIG. 3 for the purposes of simplicity. For example, in some implementations, the flash memory controller 300 may include a host interface (not shown) to communicate with the host system 102 via the interface 118. The volatile memory 108 may be internal or external to the flash memory controller 300. For example, in some implementations, the volatile memory 108 may be part of a system memory (e.g., DRAM).

The volatile memory 108 may store a plurality of sets of data blocks received from the host system 102 via the interface 118. As an example, the first strip 202 may represent a first set of data blocks comprising the data 01, data 02, data 03, data 04, and data 05 received from the host system 102. A buffer 0 may be used to store parity data for the data blocks in the first strip 202. Similarly, the second strip 204 may represent a second set of data blocks comprising the data 11, data 12, data 13, data 14, and data 15 received from the host system 102. A buffer 1 may be used to store parity data for the data blocks in the second strip 204.

In some embodiments, each of the data 01-data 05 in the first strip 202 may include a respective parity data associated with it that may be similar to the parity 108b as discussed with reference to FIG. 1. Similarly, each of the data 11-data 15 may include a respective parity data associated with it that may be similar to the parity 108b. The parity data associated with each data block may be used by the write path error detector 114 to detect errors in a given data block. For example, the errors may be caused due to the storage error in the volatile memory 108 or due to the transmission errors in the write path 110.

The backend flash controller 302 may include a write path manager 306, a parity calculator 306, a processor 308, a memory 312 and a flash memory buffer 310 in addition to the write path error detector 114 as discussed with reference to FIG. 1. Note that some or all the components of the backend flash controller 302 may be part of an apparatus.

The write path manager 304 may be configured to receive one data block at a time from the volatile memory 108 via the write path 110 for writing into the flash memory 104. For example, the write path manager 304 may receive the data 01, data 02, data 03, data 04 or the data 05 for the first strip 202, or the data 11, data 12, data 13, data 14 or the data 15 for the second strip 204. The write path manager 304 may provide the received data block to the write path error detector 114 and to the parity calculator 306. If an error is detected in the received data block by the write path error detector 114, the write path manager 304 may be further configured to stall the data block with the error from storing in the flash memory buffer 310. Stalling the data may indicate stopping or not allowing the data block from storing in the flash memory buffer 310. This selected stalling by the write path manager 304 can allow some independent data in different flash memory dies or planes to be programmed during the time of write path error correction. For example, the write path manager 304 may also be configured to allow storing of subsequent received data blocks without error after receiving the data block with the error into the flash memory buffer 310 during the error correcting of the data block with the error. Thus, some embodiments can provide efficient data recovery in case of write path errors by speeding up the write performance and hiding the write path error correction latency.

The parity calculator 306 may be configured to calculate a parity data for one or more received data blocks from a set of data blocks. For example, the set of data blocks may include data blocks in a strip, e.g., the first strip 202 or the second strip 204. The parity calculator 306 may include a parity buffer 306a. The parity buffer 306a may be configured to store the parity data calculated by the parity calculator 306. In some embodiments, the parity calculator 306 may perform an XOR operation between the received data block from the set of data blocks and the previous parity data stored in the parity buffer 306a to calculate the new parity data. The data block from the set of data blocks may include an error free data block received from the volatile memory 108 or an error corrected data block by the error corrector 116. As an example, the parity buffer 306a may initially have all zeros. When the data 01 is received and no error is found in the data 01, the parity calculator 306 may calculate the parity data for the data 01 by performing an XOR operation on the value of the data 01 and the data stored in the parity buffer 306a (e.g., all zeros). The calculated parity data may be stored in the parity buffer 306a to be used to calculate the parity for the next data, e.g. data 02. For example, when the data 02 is received and no error is found in the data 02, the parity calculator 306 may calculate the new parity data by performing an XOR operation on the value of the data 02 and the parity data previously stored in the parity buffer 306a (e.g., parity data for the data 01).

If an error is found in any of the data blocks received from the volatile memory 108, the parity data calculated by the parity calculator 306 may be inaccurate and therefore the parity buffer 306a may store the wrong parity data. In such cases, the write path manager 304 may be configured to read the data block with the error again into the parity buffer 306a. This may result in the parity calculator 306 performing the XOR operation again with the same data having the error to correct the wrong parity data stored in the parity buffer 306a. Once the parity data in the parity buffer 306a has been restored to the correct parity data, the parity calculator 306 may continue to calculate the parity data for all the error free data blocks from the set of data blocks received from the volatile memory 108. Once the error in the data block has been corrected, the parity calculator 306 may be further configured to calculate the parity data for the error corrected data block and the error free data block stored in the parity buffer 306a. Once the parity data for the set of data blocks has been calculated, the parity data may be sent to the flash memory buffer 310 along with the error corrected data block to be written into the flash memory 104.

The processor 308 may be configured to execute instructions stored in a memory 312. The memory 312 may include an SRAM, DRAM, SDRAM, ROM, EEPROM or any suitable memory configured to store instructions that can be executed by the processor 308. In some embodiments, the memory 312 may include a non-transitory computer readable medium configured to store instructions to perform error correction on the data block with an error. For example, the error corrector 116 may be implemented in software that may be part of the memory 312. In some implementations, the error corrector 116 may perform ECC correction to correct the error in the data block with the error. In some embodiments, the instructions stored in the memory 312 may further cause the processor 308 to determine that the error in the data block has been corrected and to store the recalculated parity data and the error corrected data block in the flash memory buffer 310.

The flash memory buffer 310 may be configured to receive one data block at a time from the set of data blocks including the parity data for the set of data blocks. Once all the data blocks for the set of data blocks have been received by the flash memory buffer 310, the data blocks can be sent to the flash memory 104 to be stored in the flash memory 104 and the flash memory buffer 310 can be released to store the next set of data blocks.

Figure 4:
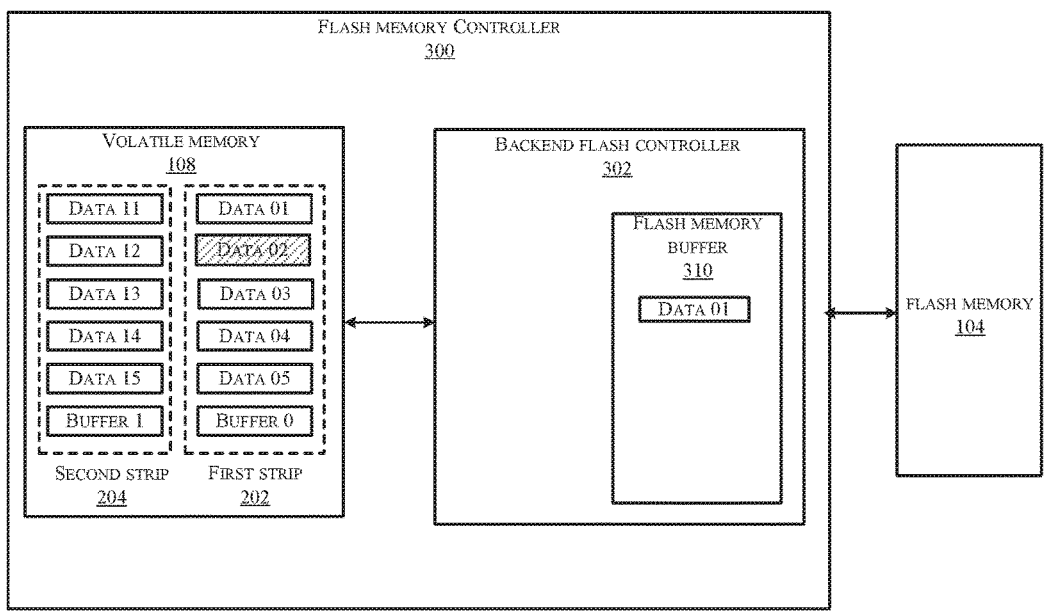
FIG. 4 shows an example illustration for processing of a data block with an error by the flash memory controller, in one embodiment.

FIG. 4 shows an example illustration for processing of a data block with an error by the flash memory controller 302 in one embodiment. Note that only certain components of the backend flash controller 302 are shown in FIG. 4 for the simplicity of illustration.

In some implementations, one data block at a time may be received by the backed flash controller 302 from the volatile memory 108. For example, in one instance, the data 01 may be received by the backend flash controller 302. The write path manager 304 may forward the data 01 to both the write path error detector 114 and the parity calculator 306. If there is no error detected in the data 01 by the write path error detector 114, the error free data 01 may be stored in the flash memory buffer 310. The parity calculator 306 may calculate the parity data for the data 01 by performing an XOR operation on the data 01 and the contents of the parity buffer 306a. As an example, the parity buffer 306a may be reset to all zeros before storing first data block for each set of data blocks. Thus, the parity buffer 306a may now store the data 01 as the parity data. The calculated parity data may be written back into the parity buffer 306a.

Next, the data 02 may be received by the backend flash controller 302. The write path manager 304 may forward the data 02 to both the write path error detector 114 and the parity calculator 306. If there is an error detected in the data 02 by the write path error detector 114, the write path manager 304 may stall the data 02 with the error from storing in the flash memory buffer 310. However, the parity calculator 306 may calculate the parity data by performing an XOR operation on the data 02 with the error and the previously stored data 01 as the parity data, as shown below:

$$(\text{data01}) \text{XOR} (\text{data02}) \quad \quad \text{Equation (1)}$$

Thus, the parity buffer 306a may store incorrect parity data calculated using equation (1). The error corrector 116 may perform ECC correction to correct the error in the data 02. In some embodiments, the data 02 with the error may be read again from the volatile memory 108 into the parity buffer 306a to perform parity correction to correct the parity data stored in the parity buffer 306a. The parity calculator 306 may be configured to recalculate the parity data by performing another XOR operation on the corrupt data 02 and the incorrect parity data stored in the parity buffer 306a, as shown below:

$$(\text{data01}) \text{XOR} (\text{data02}) \text{XOR} (\text{data02}) \quad \quad \text{Equation (2)}$$

The parity buffer 306a may now store the correct parity data (e.g., data 01) as calculated using equation (2). In some embodiments, the write path manager 304 may allow storing of subsequently received data without error into the flash memory buffer 310 during the error correcting of the data 02 with the error. This is further discussed with reference to FIG. 5.

Figure 5:
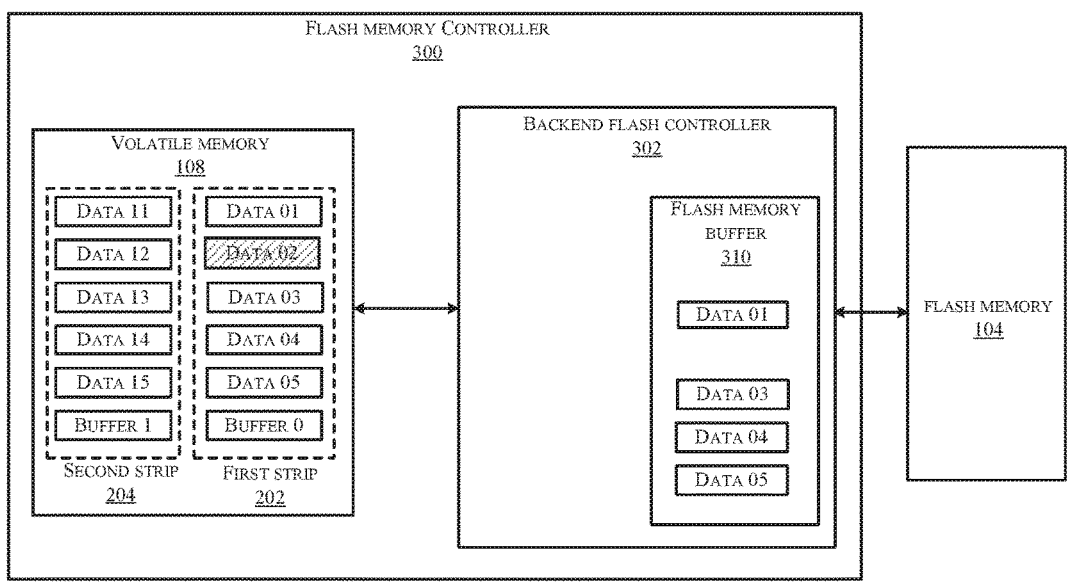
FIG. 5 shows an example illustration for processing of error free data blocks following the data block with error, in one embodiment.

FIG. 5 shows an example illustration for processing of error free data blocks following the data block with error in one embodiment. Note that only certain components of the backend flash controller 302 are shown in FIG. 5 for the simplicity of illustration.

In some embodiments, the write path manager 304 may allow the storing of subsequently received data blocks without error into the flash memory buffer 310 during the error correcting of the data block with the error. As discussed with reference to FIG. 4, during the error correcting of the data 02, some embodiments can allow storing the error free data blocks received after the corrupt data 02 into the flash memory buffer 310.

While the error in the data 02 is corrected by the error corrector 116, the data 03 may be received by the backend flash controller 302. The write path manager 304 may forward the data 03 to both the write path error detector 114 and the parity calculator 306. If there is no error detected in the data 03 by the write path error detector 114, the write path manager 304 may forward the data 03 for storing in the flash memory buffer 310. The parity calculator 306 may recalculate the parity data by performing an XOR operation on the received data 03 and the data 01 previously stored in the parity buffer 306a, as shown below:

$$(\text{data03}) \text{XOR} (\text{data01}) \quad \quad \text{Equation (3)}$$

Similarly, the data 04 may be received by the backend flash controller 302 after processing the data 03. The write path manager 304 may forward the data 04 to both the write path error detector 114 and the parity calculator 306. If there is no error detected in the data 04 by the write path error detector 114, the write path manager 304 may forward the data 04 for storing in the flash memory buffer 310. The parity calculator 306 may recalculate the parity data by performing an XOR operation on the received data 04 and the parity data stored in the parity buffer 306a, as shown below:

$$(\text{data04}) \text{XOR} (\text{data03}) \text{XOR} (\text{data01}) \quad \quad \text{Equation (4)}$$

Next, the data 05 may be received by the backend flash controller 302 after processing data 04. The write path manager 304 may forward the data 05 to both the write path error detector 114 and the parity calculator 306. If there is no error detected in the data 05 by the write path error detector 114, the write path manager 304 may forward the data 05 for storing in the flash memory buffer 310. The parity calculator 306 may recalculate the parity data by performing an XOR operation on the data 05 and the parity data stored in the parity buffer 306a, as shown below:

$$(\text{data05}) \text{XOR} (\text{data04}) \text{XOR} (\text{data03}) \text{XOR} (\text{data01}) \quad \quad \text{Equation (5)}$$

If the data 02 has been corrected during the processing of the data 03, data 04 and data 05, the write path manager 304 may forward the corrected data 02 for storing in the flash memory buffer 310 as discussed with reference to FIG. 6.

Figure 6:
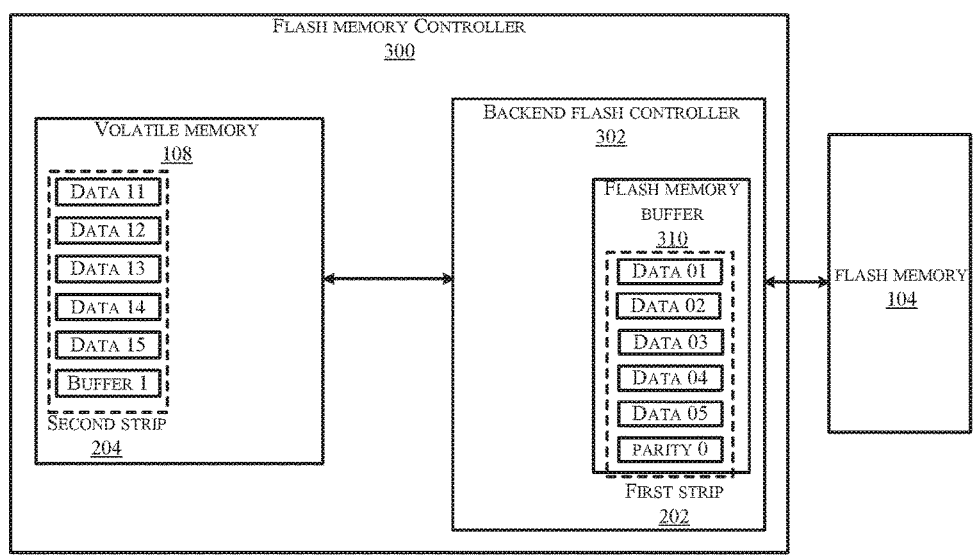
FIG. 6 shows an example illustration for storing of the error corrected data in one embodiment.

FIG. 6 shows an example illustration for storing of the error corrected data in one embodiment. Note that only certain components of the backend flash controller 302 are shown in FIG. 6 for the simplicity of illustration.

The error corrected data 02 may be received by the parity calculator 306. The parity calculator 306 may calculate the parity data "parity 0" for the first strip 202 by performing an XOR operation on the error corrected data 02 and the parity data stored in the parity buffer 306a, as shown below:

$$(\text{error corrected data02}) \text{XOR} (\text{data05}) \text{XOR} (\text{data04}) \\ \text{XOR} (\text{data03}) \text{XOR} (\text{data01}) \quad \text{Equation (6)}$$

The write path manager 304 may forward the parity 0 for the first strip 202 for storing in the flash memory buffer 310 along with the error corrected data 02. Once all the data blocks in the first strip 202 along with the parity 0 have been stored in the flash memory buffer 310, the corresponding memory space in the volatile memory 108 can be released.

Figure 7:
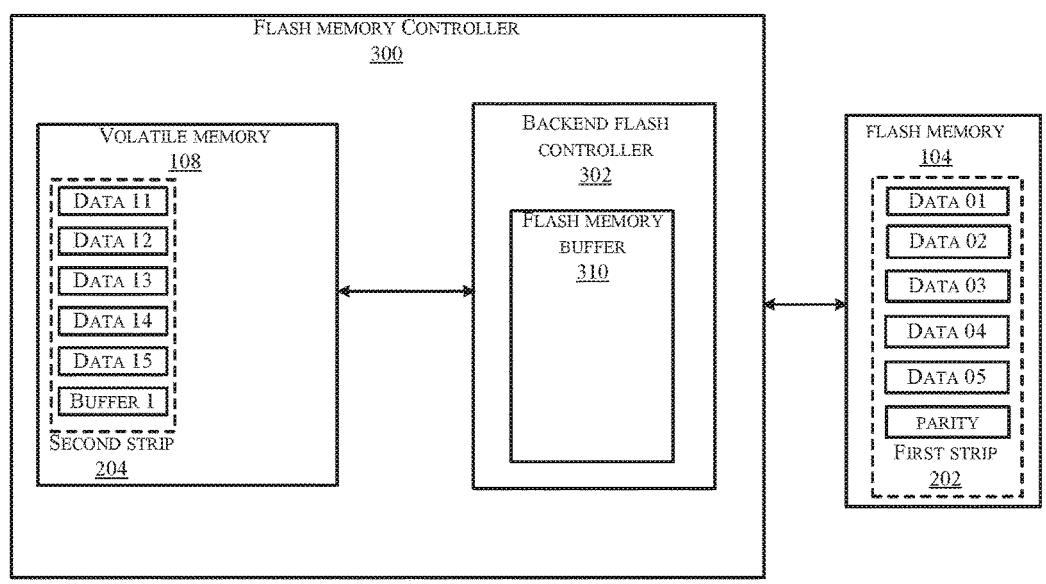
FIG. 7 shows an example illustration for storing of the error corrected data block and error free data blocks in the flash memory, in one embodiment.

FIG. 7 shows an example illustration for storing of the error corrected data block and error free data blocks in the flash memory 104, in one embodiment. Note that only certain components of the backend flash controller 302 are shown in FIG. 7 for the simplicity of illustration.

As illustrated in FIG. 7, the error corrected data block data 02 and the error free data blocks data 01, 03, 04, 05 for the first strip 202 can be released from the flash memory buffer 310 and can be stored in the flash memory 104. Referring back to FIG. 2, the data 01 can be stored in the flash 1 104a, the corrected data 02 can be stored in the flash 2 104b, the data 03 can be stored in the flash 3 104c, the data 04 can be stored in the flash 4 104d, the data 05 can be stored in the flash 5 104e, and the parity 0 can be stored in the parity flash 206. If the error in the data 02 has not been corrected and all the other data blocks in the first strip 202 have been stored in the flash memory 104, data blocks from the other strip can be sent to the flash memory buffer 310, as discussed with reference to FIG. 8.

Figure 8:
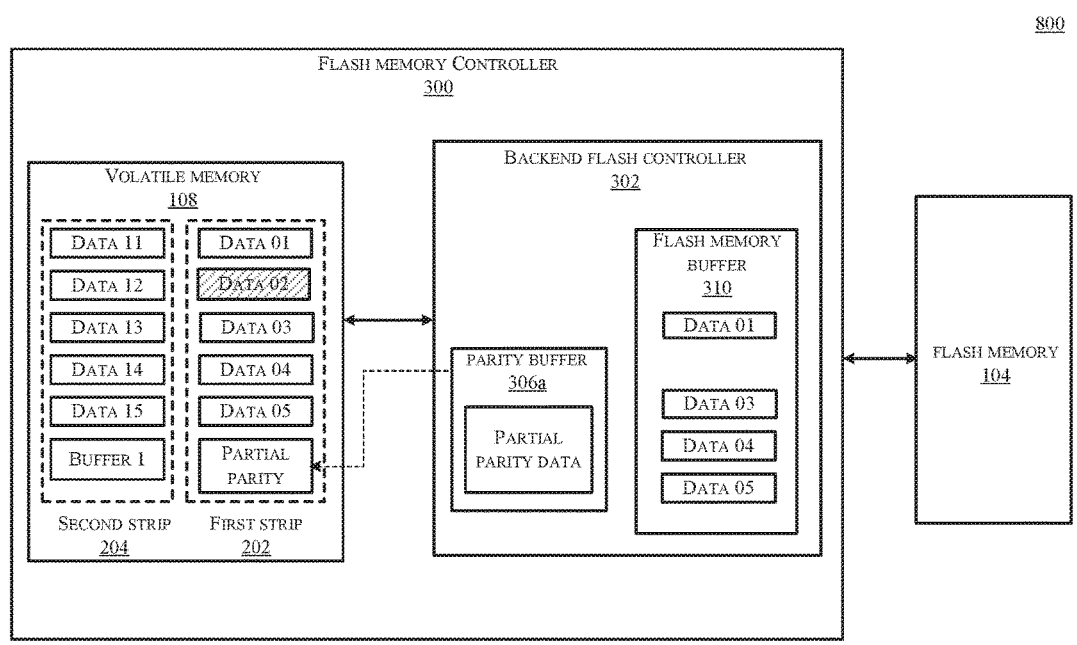
FIG. 8 shows an example illustration of calculation of partial parity data for the data block with the error in one embodiment.

FIG. 8 shows an example illustration of calculation of partial parity data for the data block with the error in one embodiment. Note that only certain components of the backend flash controller 302 are shown in FIG. 8 for the simplicity of illustration.

As illustrated in FIG. 8, if the error in the data 02 has not been corrected and all the other data blocks in the first strip 202 have been stored in the flash memory buffer 310, the embodiments can allow sending the data block for the second strip 204. In one embodiment, partial parity data stored in the parity buffer 306a for the first strip 202 can be stored in the volatile memory 108. For example, the partial parity data may have been calculated using the data 01, data 03, data 04 and the data 05 using the equation (5). This may allow releasing the parity buffer 306a to be used to store the parity data for the second strip 204. The embodiments can further allow storing the data block for the first strip 202 in the flash memory 104 as discussed with reference to FIG. 9.

Figure 9:
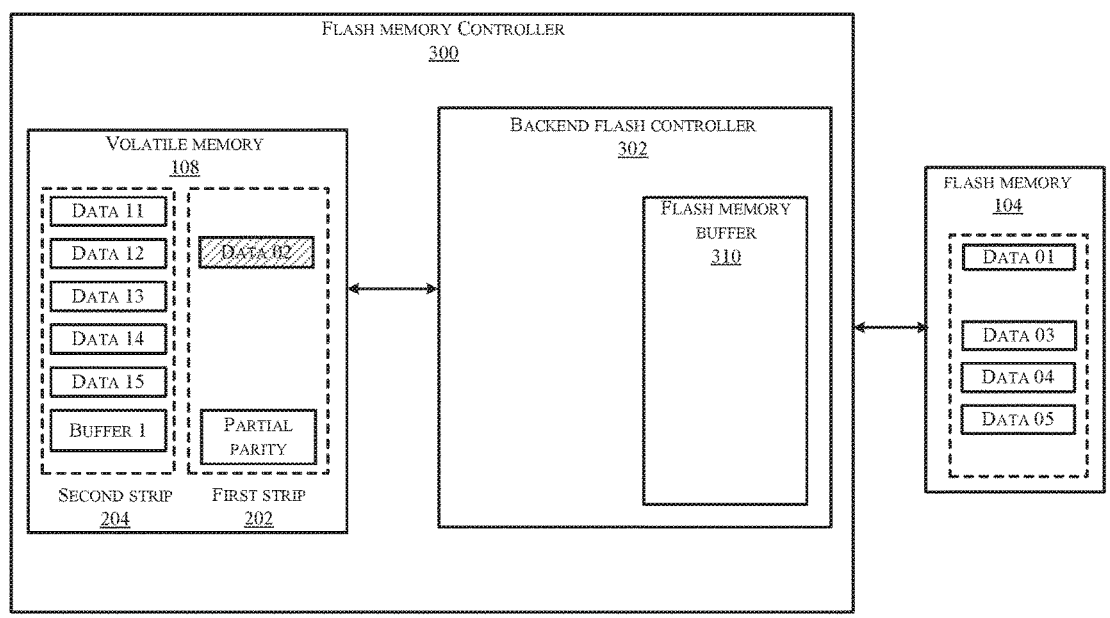
FIG. 9 shows an example illustration for storing partial parity data for a strip in the flash memory, in one embodiment.

FIG. 9 shows an example illustration for storing partial parity data for a strip in the flash memory, in one embodiment. Note that only certain components of the backend flash controller 302 are shown in FIG. 9 for the simplicity of illustration.

As illustrated in FIG. 9, if the error in the data 02 has not been corrected, all the other data for the first strip 202 (e.g., data 01, data 03, data 04 and data 05) may be sent to be stored in the flash memory 104 without the data 02 having the error. This may allow releasing the memory space for the partial data in the volatile memory 108 while storing the partial parity data in the volatile memory 108 until the error in the data 02 has been corrected. Some embodiments can allow sending the data for the second strip 204 as discussed with reference to FIG. 10.

Figure 10:
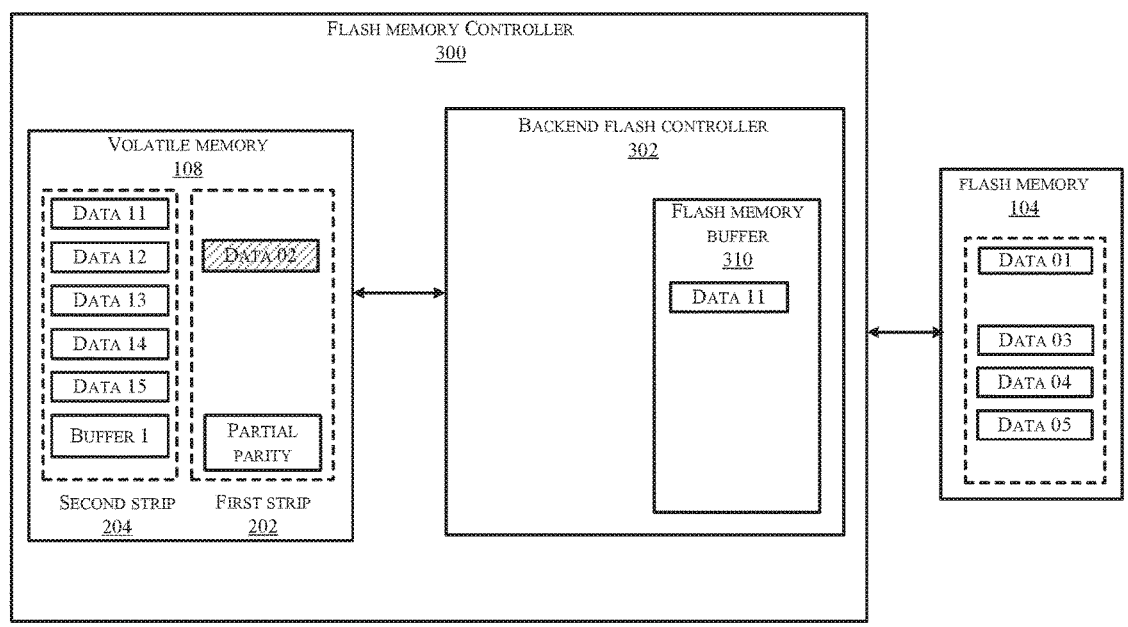
FIG. 10 shows an example illustration for storing data blocks for a second strip while an error is corrected in the data block for the first strip, in one embodiment.

FIG. 10 shows an example illustration for storing data blocks for a second strip while an error is corrected in the data block for the first strip, in one embodiment. Note that only certain components of the backend flash controller 302 are shown in FIG. 10 for the simplicity of illustration.

As illustrated in FIG. 10, if the error in the data 02 has not been corrected, some embodiments can allow storing the data blocks without error for the second strip 204 into the flash memory buffer 310. For example, write path manager 304 may forward the data 11 to both the write path error detector 114 and the parity calculator 306. If there is no error detected in the data 11 by the write path error detector 114, the write path manager 304 may forward the data 11 for storing in the flash memory buffer 310. The parity calculator 306 may calculate the parity data for the received data 11 and store the parity data in the parity buffer 306a.

Figure 11:
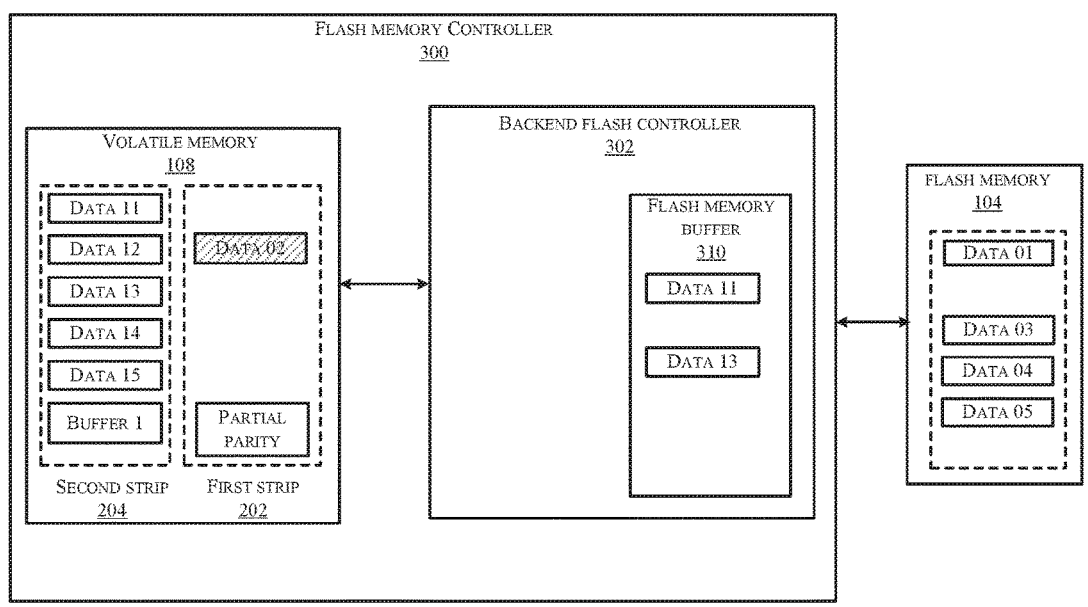
FIG. 11 shows an example illustration for continuation of storing the data blocks for the second strip while an error is corrected in the data block for the first strip, in one embodiment.
Figure 12:
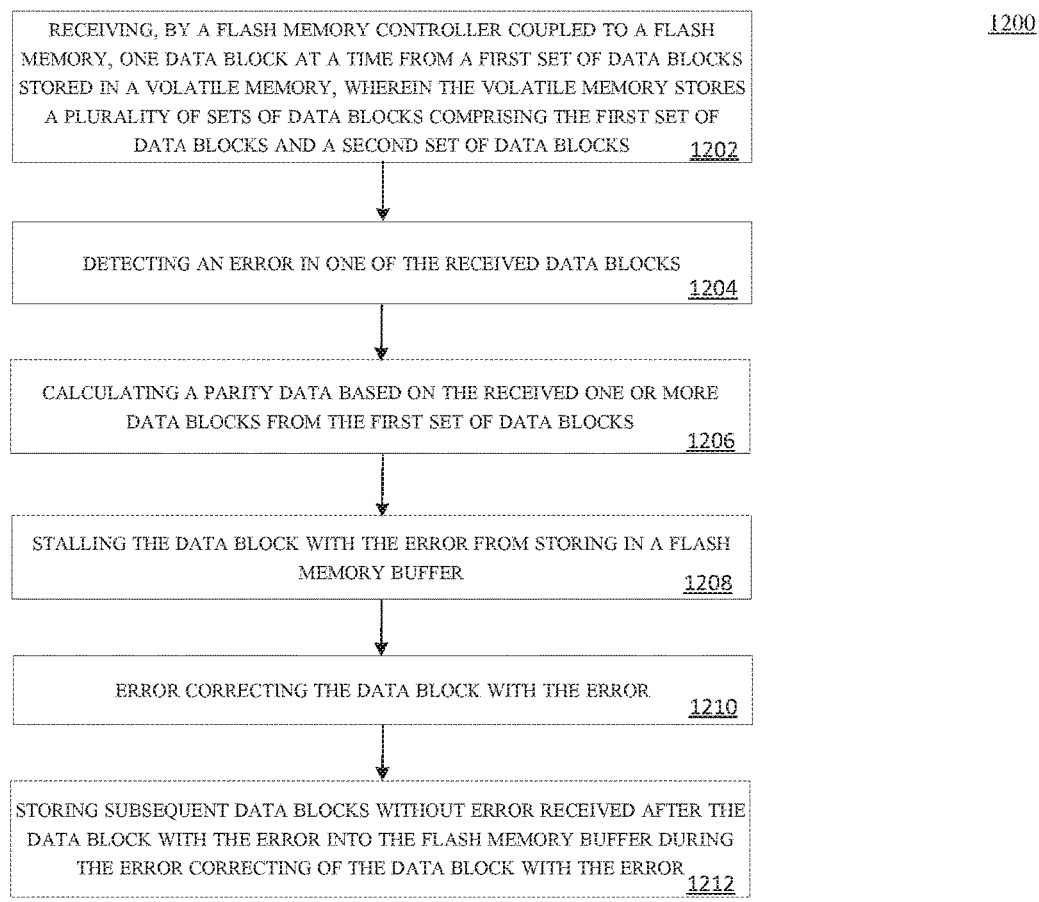
FIG. 12 illustrates a method performed by the flash memory controller to improve the write performance in case of write path errors.

FIG. 11 shows an example illustration for continuation of storing the data blocks for the second strip while an error is corrected in the data block for the first strip, in one embodiment. Note that only certain components of the backend flash controller 302 are shown in FIG. 11 for the simplicity of illustration.

As illustrated in FIG. 11, if the error in the data 02 has not been corrected, some embodiments can stall sending the data block from another set of data blocks which is on the same plane or the same die as the data 02 having the error for storing in the flash memory buffer 310. As shown in FIG. 11, data 12 may be stalled to be stored in the flash memory buffer 310 but the embodiments can allow sending the subsequent data after the data 12 to the flash memory buffer 310. Therefore, data 13 can be stored in the flash memory buffer 310. At any point, when the error in the data 02 has been corrected, the data 02 and the data 12 can be stored in the flash memory 104 along with the recalculated parity. Embodiments of the invention can also be applied to improve write performance in case of write path errors with multiple data blocks without deviating from the scope of the disclosed technology.

FIG. 12 illustrates a method 1200 performed by the flash memory controller 300 to improve the write performance in case of write path errors, in one embodiment.

In step 1202, a flash memory controller may receive one data block at a time from a first set of data blocks stored in a volatile memory. The volatile memory may store a plurality of sets of data blocks comprising the first set of data blocks and the second set of data blocks. Referring back to FIG. 3, the backend flash controller 302 may receive one data block at a time from the first set of data blocks (e.g., data 01-data 05) for the first strip 202 stored in the volatile memory 108. The volatile memory 108 may also store the second set of data blocks (e.g., data 11-data 15) for the second strip 204. The write path manager 304 may forward each received data block to the write path error detector 114 and to the parity calculator 306.

In step 1204, the backend flash controller 302 may detect an error in one of the received data blocks. For example, the write path manager 304 may receive a first data block data 01 and may forward the data 01 to the write path error detector 114 and to the parity calculator 306. As discussed with reference to FIG. 4, the write path error detector 114 may not detect an error in the received data block data 01 and the data 01 may be stored in the flash memory buffer 310. The parity calculator 306 may calculate the parity data by performing an XOR operation on the data 01 and contents of the parity buffer 306a (e.g., zeros) and may store the calculated parity data in the parity buffer 306a. Next, the write path manager 304 may receive a second data block data 02 and may forward the data 02 to the write path error detector 114 and to the parity calculator 306. As discussed with reference to FIG. 5, the write path error detector 114 may detect an error in the received data block data 02. For example, the write path error detector 114 may detect the error using the ECC data associated with the data 02.

In step 1206, the backend flash controller 302 may calculate a parity data based on the received one or more data blocks from the first set of data blocks. The parity calculator 306 may calculate a parity data based on the received data blocks data 01 and data 02. For example, the parity calculator 306 may perform an XOR operation on the received data block data 02 and the parity data stored in the parity buffer 306a (e.g., data 01) as shown in equation (1). The parity calculator 306 may store the calculated parity data in the parity buffer 306a. In some implementations, the steps 1204 and 1206 may be performed in parallel.

In step 1208, the backend flash controller 302 may stall the data block with the error from storing in a flash memory buffer. As discussed with reference to FIG. 3, the write path manager 308 may stall the data 02 with the error from storing in the flash memory buffer 310 to avoid writing corrupt data in the flash memory 104.

In step 1210, the backend flash controller 302 may error correct the data block with the error. As discussed with reference to FIG. 3, the error corrector 116 may perform ECC correction to correct the error in the data 02. Additionally, parity correction may be performed to correct the parity data stored in the parity buffer 306a by reading the data 02 with the error again into the parity buffer 306a and recalculating the parity data using the equation (2).

In step 1212, the backend flash controller 302 may store subsequent data blocks without error received after the data block with the error into the flash memory buffer during the error correcting of the data block with the error. As discussed with reference to FIG. 5, during the error correcting of the data 02, subsequent data blocks data 03, data 04 and data 05 may be received from the volatile memory 108. If no error is detected in any of the data 03, data 04 or the data 05, the data 03, data 04 and the data 05 may be stored in the flash memory buffer 310. Thus, the embodiments can minimize stalling of the data in case of write path errors by limiting the stalling only for the data block with the error and allowing the data block without the error to pass through. Thus the selected stalling can improve the write performance for write path errors.

If the error in the data 02 has been corrected during the storing of the subsequent data 03, data 04 and the data 05 in the flash memory buffer 310, the parity calculator 306 may recalculate the parity data for the first set of data blocks based on the error corrected data 02, and the data 03, data 04 and the data 05 without error. The recalculated parity data for the first set of data blocks and the error corrected data block 02 can be stored in the flash memory buffer 310. In the next step, the recalculated parity data for the first set of data blocks and the error corrected data block 02 can be sent to be stored in the flash memory 104 and the flash memory buffer 310 can be released to store the next set of data blocks.

If the error in the data 02 has not been corrected during the storing of the subsequent data 03, data 04 and the data 05 in the flash memory buffer 310, the data 03, data 04 and the data 05 can be sent to be stored in the flash memory 104 without the corrupt data 02. The parity calculator 306 may recalculate a partial parity data for the first set of data blocks based on the data 03, data 04 and the data 05. As discussed with reference to FIG. 8, the partial parity data for the first set of data blocks without the data 02 can be stored in the volatile memory 108. Some embodiments can allow storing the data blocks from the second set of data blocks, which are not sharing the same die or plane as the data 02, into the flash memory buffer 310 during the error correction of the data 02. When the error in the data 02 is corrected, the parity calculator 306 may recalculate the parity data for the first set of data blocks based on the error corrected data 02 and the partial parity data stored in the volatile memory 108. The recalculated parity data for the first set of data blocks and the error corrected data 02 can be stored in the flash memory buffer 301 to be sent to the flash memory 104.

Thus, some embodiments can allow sending the data blocks without error to be stored in the flash memory during the error correcting of the data block with the error. This can speed up the write performance of the user data for storing in the flash memory. Additionally, performing instant parity correction to allow the user data sharing the same strip with the data block having the error to be programmed before the failed data is corrected can hide the write error correction latency. Some embodiments can provide selected stalling of the data to allow some independent data blocks on different planes or dies to be programmed during the write path error correction.

What is claimed is:

1. An apparatus comprising:
a write path error detector configured to detect if a received data block from a set of data blocks has an error;
a parity calculator configured to calculate a parity data for the data block;
a processor configured to execute instructions stored in a memory, wherein the instructions stored in the memory cause the processor to perform error correction on the data block with the error; and
a write path manager configured to:
stall the data block with the error from storing in a flash memory buffer; and
allow storing of subsequent data blocks without error received after the data block with the error into the flash memory buffer during the error correcting of the data block with the error,
wherein the parity calculator is further configured to recalculate the parity data for the set of data blocks based on the data blocks without error and the error corrected data block.

2. The apparatus of claim 1, wherein the set of data blocks is stored in a volatile memory communicatively coupled to the apparatus.

3. The apparatus of claim 2, wherein the volatile memory receives the set of data blocks from a host system communicatively coupled to the volatile memory for storing in a flash memory coupled to the apparatus.

4. The apparatus of claim 1, wherein the parity calculator further comprises a parity buffer configured to store the parity data.

5. The apparatus of claim 4, wherein the parity calculator calculates the parity data for the data block by performing an XOR operation on the received data block and contents of the parity buffer.

6. The apparatus of claim 4, wherein the recalculated parity data is stored in the parity buffer.

7. The apparatus of claim 1, wherein the write path manager is further configured to allow storing the error corrected data block and the recalculated parity data into the flash memory buffer.

8. The apparatus of claim 1, wherein the apparatus is communicatively coupled to a flash memory, and wherein the instructions stored in the memory further cause the processor to send the error corrected data block, the data blocks without error, and the recalculated parity data stored in the flash memory buffer to program the flash memory.

9. The apparatus of claim 1, wherein the flash memory buffer and the apparatus are part of a backend flash memory controller.

10. A method comprising:
receiving, by a flash memory controller coupled to a flash memory, one data block at a time from a first set of data blocks stored in a volatile memory, wherein the volatile memory stores a plurality of sets of data blocks comprising the first set of data blocks and a second set of data blocks;
detecting, by the flash memory controller, an error in one of the received data blocks;
calculating, by the flash memory controller, a parity data based on the received one or more data blocks from the first set of data blocks;
stalling, by the flash memory controller, the data block with the error from storing in a flash memory buffer;
error correcting, by the flash memory controller, the data block with the error; and
storing, by the flash memory controller, subsequent data blocks without error received after the data block with the error into the flash memory buffer during the error correcting of the data block with the error.

11. The method of claim 10, the method further comprising:
determining, by the flash memory controller, that the error in the data block with the error has been corrected;
recalculating, by the flash memory controller, the parity data for the first set of data blocks based on the error corrected data block and the data blocks without error; and
storing, by the flash memory controller, the recalculated parity data for the first set of the data blocks, and the error corrected data block in the flash memory buffer.

12. The method of claim 11, the method further comprising:
sending, by the flash memory controller, the parity data for the first set of the data blocks, the error corrected data block, and the data blocks without error to be stored in the flash memory.

13. The method of claim 10, the method further comprising:
- determining, by the flash memory controller, that the error in the data block with the error has not been corrected after receiving all the data blocks from the first set of data blocks; and
- sending, by the flash memory controller, the first set of data blocks without the data block with the error to be stored in the flash memory.

14. The method of claim 13, the method further comprising:
- recalculating, by the flash memory controller, the parity data for the first set of data blocks without the error corrected data block; and
- storing, by the flash memory controller, the recalculated parity data for the first set of data blocks in the volatile memory.

15. The method of claim 14, the method further comprising:
- receiving, by the flash memory controller, a data block from the second set of data blocks from the plurality of data blocks stored in the volatile memory;
- determining, by the flash memory controller, that the data block from the second set of data blocks does not include an error; and
- storing, by the flash memory controller, the data block from the second set of data blocks in the flash memory buffer.

16. The method of claim 10, wherein the flash memory includes a plurality of flash memory dies and wherein a respective data block in each set of data blocks is stored in a same flash memory die or same flash memory plane.

17. The method of claim 16, wherein a data block which shares the same flash memory die or the same flash memory plane with the data block with the error is stalled from storing in the flash memory buffer until the error is corrected.

18. The method of claim 10, the method further comprising:
- storing the parity data in a parity buffer, wherein the parity data is calculated by performing an XOR operation on the received data block and contents of the parity buffer.

19. A non-transitory computer readable medium having stored thereon instructions that, when executed by a processor, perform a method, comprising:
- determining that there is an error in a data block from a set of data blocks, wherein the set of data blocks is stored in a volatile memory communicatively coupled to the processor, wherein the data block with the error is stalled from storing in a flash memory buffer coupled to the processor;
- error correcting the data block with the error; and
- storing subsequent data blocks without error received after the data block with the error into the flash memory buffer during the error correcting of the data block with the error.

20. The non-transitory computer readable medium of claim 19, wherein the processor is part of a flash memory controller for a flash memory device.

* * * * *